United States Patent
Sakurai et al.

(10) Patent No.: US 9,577,442 B2
(45) Date of Patent: Feb. 21, 2017

(54) CELL BALANCE DEVICE AND BATTERY SYSTEM

(75) Inventors: Atsushi Sakurai, Chiba (JP); Kazuaki Sano, Chiba (JP); Hiroshi Saito, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 1212 days.

(21) Appl. No.: 13/292,482

(22) Filed: Nov. 9, 2011

(65) Prior Publication Data
US 2012/0139493 A1 Jun. 7, 2012

(30) Foreign Application Priority Data

Dec. 6, 2010 (JP) .................................. 2010-271808
Aug. 4, 2011 (JP) .................................. 2011-171316

(51) Int. Cl.
*H02J 7/00* (2006.01)

(52) U.S. Cl.
CPC .................................... *H02J 7/0016* (2013.01)

(58) Field of Classification Search
USPC ......................................... 320/116, 118, 119
See application file for complete search history.

(56) References Cited

U.S. PATENT DOCUMENTS

| | | | | |
|---|---|---|---|---|
| 6,459,236 B2 * | 10/2002 | Kawashima | | 320/118 |
| 6,479,975 B1 | 11/2002 | Plankensteiner et al. | | |
| 6,841,971 B1 * | 1/2005 | Spee | | H01M 10/44 320/119 |
| 7,015,745 B1 | 3/2006 | Burinskiy et al. | | |
| 7,612,537 B2 * | 11/2009 | Wynne et al. | | 320/134 |
| 7,679,369 B2 * | 3/2010 | Hartzog et al. | | 324/426 |
| 7,772,803 B2 * | 8/2010 | Jaeger et al. | | 320/116 |
| 7,863,904 B2 * | 1/2011 | Takeda et al. | | 324/522 |

(Continued)

FOREIGN PATENT DOCUMENTS

EP 2 352 218 A2 8/2011

OTHER PUBLICATIONS

US 5,821,429, 10/1998, Schmidt et al. (withdrawn)

(Continued)

*Primary Examiner* — Richard Isla Rodas
*Assistant Examiner* — Michael Dibenedetto
(74) *Attorney, Agent, or Firm* — Brinks Gilson & Lione

(57) ABSTRACT

Provided are a cell balance device with high cell balance performance and high cell balance speed and requiring no high voltage process, and a battery system including the cell balance devices. The cell balance device includes: three terminals to be connected to secondary batteries; one terminal to be connected to a voltage hold device; three switches provided between the three terminals and the one terminal; and a receiving terminal and a transmitting terminal for a synchronization signal. Alternatively, the cell balance device includes: four terminals to be connected to secondary batteries; two terminals to be connected to a voltage hold device; six switches provided between the four terminals and the two terminals; and a receiving terminal and a transmitting terminal for a synchronization signal. The battery system includes: a plurality of secondary batteries; a plurality of voltage hold devices; a plurality of cell balance devices; and a clock generation circuit.

10 Claims, 13 Drawing Sheets

(56) References Cited

U.S. PATENT DOCUMENTS

| | | | |
|---|---|---|---|
| 7,973,534 B2* | 7/2011 | Tatebayashi | H02J 7/0026 |
| | | | 320/116 |
| 8,188,750 B2* | 5/2012 | Ohnuki | 324/429 |
| 8,288,999 B2* | 10/2012 | Hsu | H02J 7/0014 |
| | | | 320/128 |
| 8,384,343 B2 | 2/2013 | Kojori et al. | |
| 8,692,508 B2* | 4/2014 | Shimizu | 320/103 |
| 8,766,598 B2* | 7/2014 | Oh et al. | 320/119 |
| 2007/0268000 A1* | 11/2007 | Kobayashi | H02J 7/0019 |
| | | | 320/118 |
| 2008/0036424 A1* | 2/2008 | Saigo | 320/136 |
| 2008/0211456 A1* | 9/2008 | Bolz et al. | 320/116 |
| 2011/0163728 A1 | 7/2011 | Sutardja et al. | |

OTHER PUBLICATIONS

European Search Report in corresponding European Application No. 12 18 0203, dated Aug. 7, 2014, 2 pages.

Ex Parte Quayle Action for U.S. Appl. No. 13/571,572 dated Dec. 4, 2014, 6 pages.

Notice of Allowance for U.S. Appl. No. 13/571,572 dated Feb. 3, 2015, 5 pages.

* cited by examiner

CELL BALANCE DEVICE AND BATTERY SYSTEM

RELATED APPLICATIONS

This application claims priority under 35 U.S.C. §119 to Japanese Patent Application Nos. 2010-271808 filed on Dec. 6, 2010 and 2011-171316 filed on Aug. 4, 2011, the entire contents of which are hereby incorporated by reference.

BACKGROUND OF THE INVENTION

1. Field of the Invention

The present invention relates to a cell balance device for achieving a cell balance of secondary batteries connected in series and a battery system including the cell balance devices, and more particularly, to a cell balance device capable of improving speed for achieving a cell balance with an inexpensive configuration and a battery system including the cell balance devices.

2. Description of the Related Art

FIG. 7 illustrates a circuit diagram of a conventional cell balance adjusting circuit. A cell balance device including the conventional cell balance adjusting circuit is provided with an assembled battery portion, in which a plurality of secondary battery cells (hereinafter, referred to as cells) 401 to 406 as basic components are connected in series, and switches 411 to 462 each having one contact connected to a node between the cells. The other contact of each of the switches 411, 421, 431, 441, 451, and 461 is connected to one electrode of a capacitor 407 which is a voltage hold device. The other contact of each of the switches 412, 422, 432, 442, 452, and 462 than the one contact on the cell side is connected to the other electrode of the voltage hold device 407. A load circuit or a charging circuit 408 is connected across the assembled battery.

Open/close signals for the respective switches are connected so that the switch 411 and the switch 412 may operate simultaneously. Signals are similarly connected so that the switch 421 and the switch 422, the switch 431 and the switch 432, the switch 441 and the switch 442, the switch 451 and the switch 452, and the switch 461 and the switch 462 may be open/closed simultaneously each as a switch of a set of corresponding two switches. The switch open/close signals sequentially turn ON/OFF the connections in the order of ON/OFF of the switch 411 and the switch 412, ON/OFF of the switch 421 and the switch 422, ON/OFF of the switch 431 and the switch 432, ON/OFF of the switch 441 and the switch 442, ON/OFF of the switch 451 and the switch 452, and ON/OFF of the switch 461 and the switch 462. Such open/close signals that continuously perform repetitive switch open/close operations by returning to the first ON/OFF operation of the switch 411 and the switch 412 after finishing turning ON/OFF the switch 461 and the switch 462 are connected to control portions of the respective switches.

Next, an operation is described. The switches are scanned sequentially in one direction so as to be switched over while forming parallel connections between the series-connected adjacent cells and the voltage hold device 407, to thereby form parallel connections sequentially between all the series-connected cells and the voltage hold device 407. After completion of the formation of parallel connections with all control target cells in the assembled battery, the same switching operation is repeatedly performed from the first cell, thereby adjusting a cell balance.

The switches 411 and 412 are configured to receive signals for simultaneous open/close operation, and the switch 421 and the switch 422 are also configured to be open/closed simultaneously. The same is applied to the other switches, and the simultaneous open/close operation is performed in each combination of the switch 431 and the switch 432, the switch 441 and the switch 442, the switch 451 and the switch 452, and the switch 461 and the switch 462. After the open/close operations are advanced from the switch 411 and the switch 412 and then open/close of the switch 461 and the switch 462 is completed, open/close of the switch 411 and the switch 412 is started again to repeat those operations sequentially. In the case where all the cells maintain a balanced state in which the cell voltage are equal to one another, no electric charges are exchanged between the voltage hold device 407 and the cells. The individual cell states are not affected at all by the open/close operations of the respective switches. In the case where a balance is lost among the cells, such balance adjusting function is exhibited.

In the conventional technology, however, only one voltage hold device (capacitor) is provided for the number of cells to be balanced, thus causing a problem that the battery system has low balance performance (low balance speed). In addition, when the number of secondary batteries to be connected to the cell balance device increases, a higher voltage is applied to the cell balance device, and the cell balance device therefore needs to be manufactured through high voltage process, thus causing another problem of increased cost.

SUMMARY OF THE INVENTION

The present invention has been devised in view of the above-mentioned problems, and provides a cell balance device capable of enhancing cell balance performance and requiring no high voltage process, and a battery system including the cell balance devices.

In order to solve the conventional problems, the cell balance device and the battery system according to the present invention are configured as follows.

There is provided a cell balance device for a battery system for adjusting a cell balance of a plurality of electric accumulators connected in series, the cell balance device including: a plurality of electric accumulator connection terminals to be each connected to one of a node and two terminals of the plurality of electric accumulators connected in series; a voltage hold device connection terminal to be connected to a voltage hold device; a plurality of switch circuits provided between the plurality of electric accumulator connection terminals and the voltage hold device; a receiving terminal for receiving a synchronization signal; a transmitting terminal for transmitting the synchronization signal; and a control circuit for controlling ON/OFF of the plurality of switch circuits based on the synchronization signal, in which, when receiving the synchronization signal, the control circuit sequentially controls ON/OFF of the plurality of switch circuits. Further, there is provided a battery system including the cell balance devices.

According to the present invention, the battery system having the following effects can be provided.

Cell balance performance of the battery system can be enhanced. Even if the number of secondary batteries varies, the battery system can be designed correspondingly with ease. The battery system requires no high voltage process and can therefore be reduced in cost.

DETAILED DESCRIPTION OF THE PREFERRED EMBODIMENTS

First Embodiment

Figure 1:
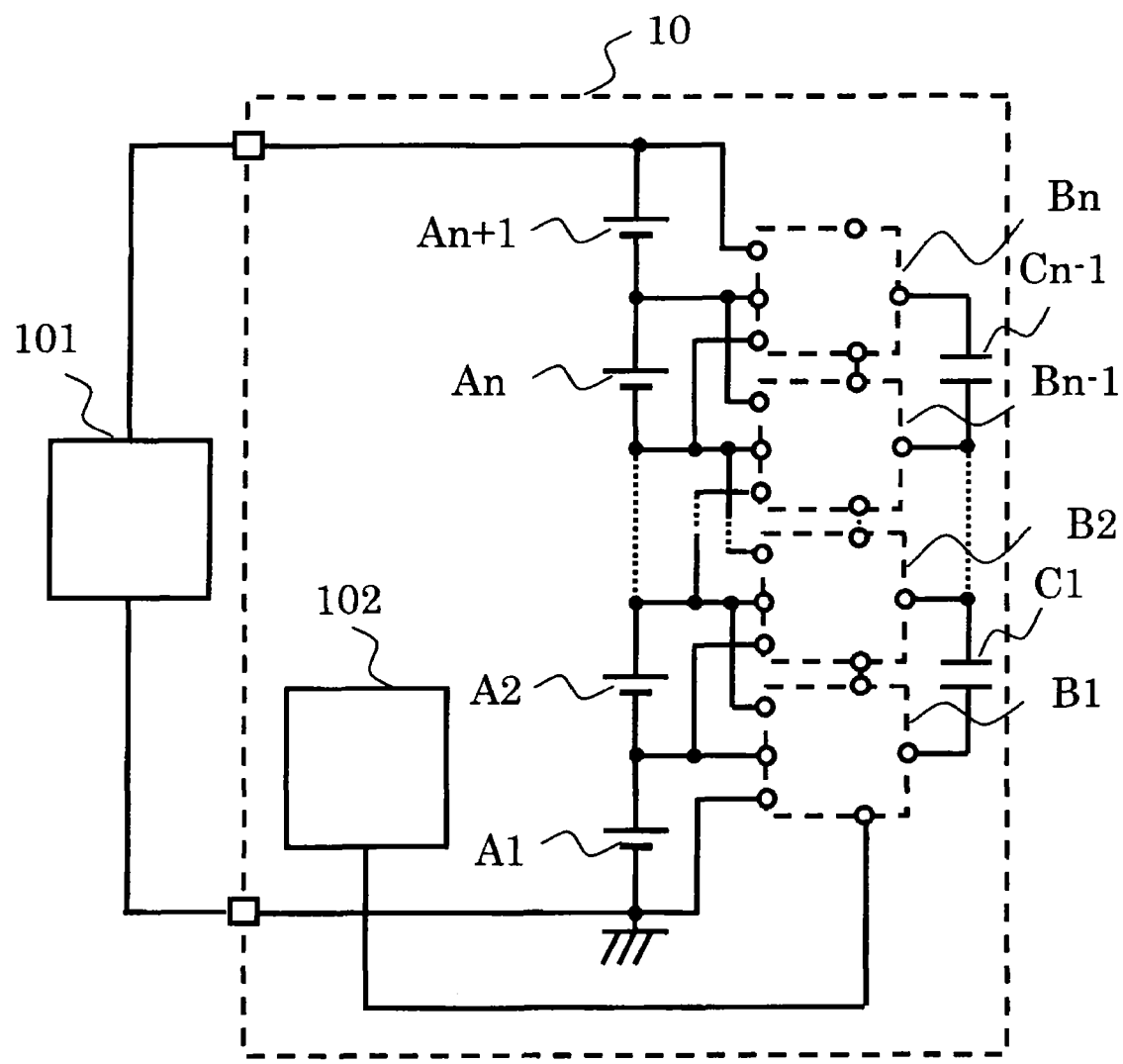
FIG. 1 is a circuit diagram of a battery system including cell balance devices according to a first embodiment of the present invention.
Figure 2:
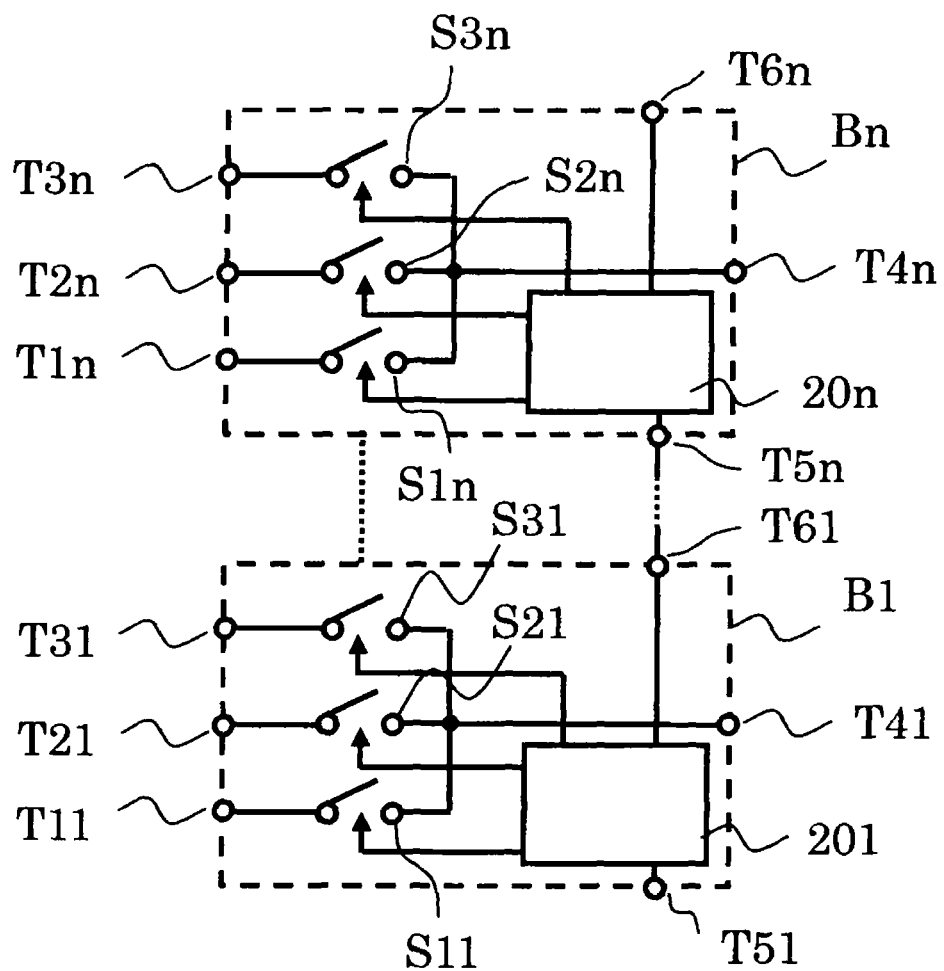
FIG. 2 is a circuit diagram of the cell balance devices according to the first embodiment.

FIG. 1 is a circuit diagram of a battery system including cell balance devices according to a first embodiment of the present invention. FIG. 2 is a circuit diagram of the cell balance devices according to the first embodiment.

A battery system 10 of the first embodiment includes a clock generation circuit 102, n+1 secondary batteries A1 to An+1 connected in series, n cell balance devices B1 to Bn, n−1 voltage hold devices (capacitors) C1 to Cn−1, and external terminals to which a charger 101 or a load is to be connected (n is an integer of 2 or more).

The first cell balance device B1 includes switch circuits S11, S21, and S31, a control circuit 201, and terminals T11, T21, T31, T41, T51, and T61. The other cell balance devices B2 to Bn have the same configuration.

In the cell balance device B1, the terminal T11 is connected to a negative terminal of the secondary battery A1, the terminal T21 is connected to a positive terminal of the secondary battery A1 and a terminal T12 of the cell balance device B2, the terminal T31 is connected to a positive terminal of the secondary battery A2 and a terminal T22 of the cell balance device B2, the terminal T41 is connected to any one terminal of the voltage hold device C1, the terminal T51 is connected to an output of the clock generation circuit 102, and the terminal T61 is connected to a terminal T52 of the cell balance device B2. In the cell balance device B2, the terminal T22 is connected to a terminal T13 of the cell balance device B3, a terminal T32 is connected to a positive terminal of the secondary battery A3 and a terminal T23 of the cell balance device B3, a terminal T42 is connected to any one terminal of the voltage hold device C2 and the other terminal of the voltage hold device C1, and a terminal T62 is connected to a terminal T53 of the cell balance device B3. The same connection as in the cell balance device B2 is made up to the (n−1)th cell balance device Bn−1. In the cell balance device Bn, a terminal T1$n$ is connected to a negative terminal of the secondary battery An, a terminal T2$n$ is connected to a positive terminal of the secondary battery An and a terminal T3$n$−1 of the cell balance device Bn−1, a terminal T3$n$ is connected to a positive terminal of the secondary battery An+1, and a terminal T4$n$ is connected to the voltage hold device Cn−1.

In the cell balance device B1, the switch circuit S11 is connected to the terminal T11 and the terminal T41, the switch circuit S21 is connected to the terminal T21 and the terminal T41, and the switch circuit S31 is connected to the terminal T31 and the terminal T41. The switch circuits S11, S12, and S13 are ON/OFF controlled by signals from the control circuit 201. The other cell balance devices B2 to Bn have the same connection.

Figure 3:
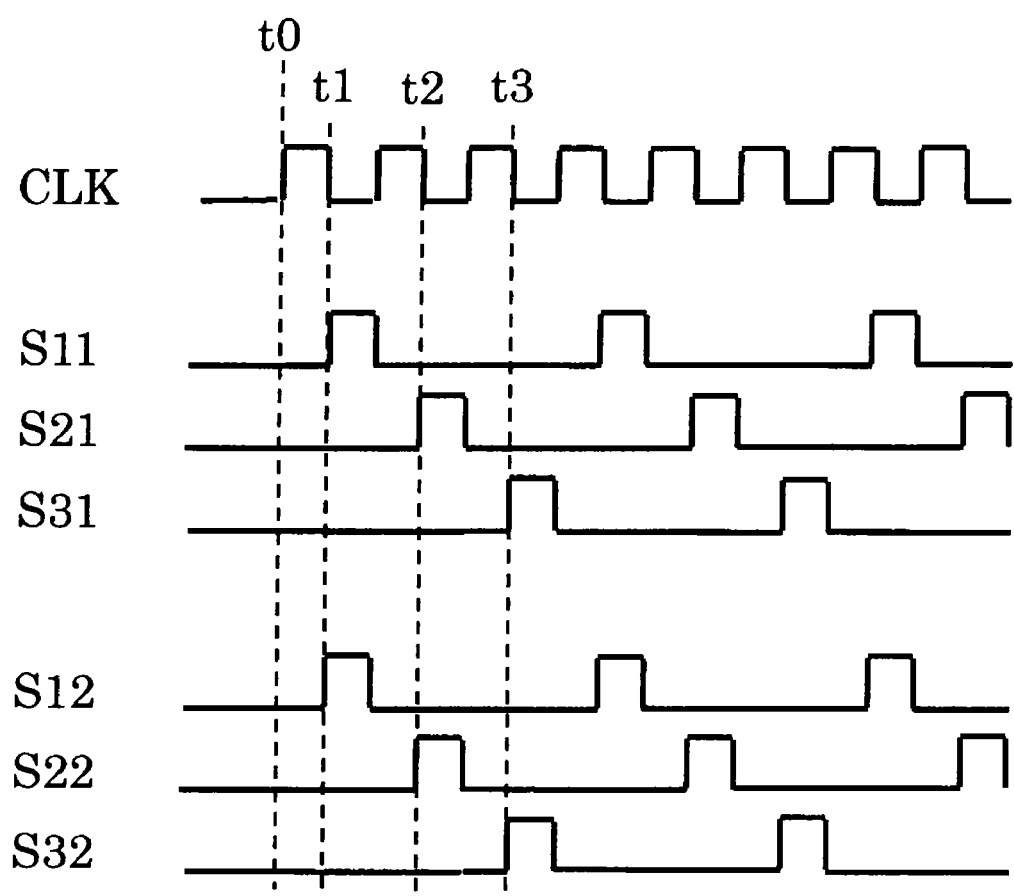
FIG. 3 is a timing chart of signals of the cell balance devices according to the first embodiment.

Next, an operation of the battery system 10 of the first embodiment is described. FIG. 3 is a timing chart of signals in the cell balance devices of the first embodiment.

At a time t0, the charger 101 is connected to the external terminals of the battery system 10, and then the clock generation circuit 102 outputs a clock signal CLK. In the cell balance device B1, when the terminal T51 receives the clock signal CLK, the control circuit 201 generates signals for turning ON the switch circuits S11 to S31 in synchronization with the clock signal CLK, and outputs the signals sequentially. The control circuit 201 further outputs the clock signal CLK to the terminal T61. In the next cell balance device B2, the terminal T52 receives the clock signal CLK from the cell balance device B1. The clock signal CLK is transmitted to the cell balance device Bn in this way, and all the cell balance devices B1 to Bn can be synchronized with one another. The switch circuits S11 to S1$n$, the switch circuits S21 to S2$n$, and the switch circuits S31 to S3$n$ are therefore respectively controlled to be turned ON sequentially in synchronization with one another.

At a time t1, the switch circuits S11 to S1$n$ are all turned ON and the switch circuits S21 to S2$n$ and the switch circuits S31 to S3$n$ are all turned OFF, and then the secondary batteries A1 to An−1 are connected in parallel to the voltage hold devices C1 to Cn−1, respectively. Then, the secondary batteries A1 to An−1 and the voltage hold devices C1 to Cn−1 perform charging or discharging, respectively.

At a time t2, the switch circuits S21 to S2$n$ are all turned ON and the switch circuits S11 to S1$n$ and the switch circuits S31 to S3$n$ are all turned OFF, and then the secondary batteries A2 to An are connected in parallel to the voltage hold devices C1 to Cn−1, respectively. Then, the secondary batteries A2 to An and the voltage hold devices C1 to Cn−1 perform charging or discharging, respectively.

At a time t3, the switch circuits S31 to S3$n$ are all turned ON and the switch circuits S11 to S1$n$ and the switch circuits S21 to S2$n$ are all turned OFF, and then the secondary batteries A3 to An+1 are connected in parallel to the voltage hold devices C1 to Cn−1, respectively. Then, the secondary batteries A3 to An+1 and the voltage hold devices C1 to Cn−1 perform charging or discharging, respectively.

Then, all the cell balance devices B1 to Bn repeat the same operation, with three clocks as one cycle.

Then, if the charger 101 is disconnected from the external terminals of the battery system 10, the clock generation circuit 102 stops outputting the clock signal CLK, thereby finishing the cell balance operation.

By repeating charging/discharging between the secondary batteries A1 to An+1 and the voltage hold devices C1 to Cn−1 in this way, the voltages of the secondary batteries A1 to An+1 can be averaged to reduce voltage fluctuations. With this configuration including the plurality of voltage hold devices corresponding to the number of secondary batteries to be balanced, the cell balance device can be enhanced in balance performance (can be increased in speed for balance).

Besides, the cell balance devices and the voltage hold devices are cascaded to constitute a cell balance system, thus being flexible to increase or decrease in number of secondary batteries. With this configuration in which the number of secondary batteries to be connected to one cell balance device is not changed even if the number of secondary batteries is increased, the cell balance device requires no high voltage process and manufacturing cost can thus be cut down.

This embodiment has exemplified the battery system 10 that includes the secondary batteries as electric accumulators. The same configuration is also applicable when the electric accumulators are electric double-layer capacitors instead.

The cell balance operation described above is adapted to be performed when the charger 101 is connected to the battery system 10. Alternatively, the cell balance operation may be performed upon detection of overdischarge of a secondary battery. The battery system 10 can increase operating time by achieving a cell balance when a secondary battery is overdischarged.

The method of synchronizing the cell balance devices B1 to Bn with one another described above is transmission and reception of the clock signal CLK, but is not limited thereto. For example, the clock signals CLK may be input in parallel to the cell balance devices B1 to Bn. Alternatively, the clock signal CLK may obtain synchronization every cycle with the use of a pulse that has different specifications from other pulses, such as a pulse with a higher crest value of the first clock at the beginning of every cycle or a pulse with a varied duty ratio. The clock signal CLK may obtain synchronization every cycle also by interposing a reset pulse that has different specifications from other pulses as described above. The clock generation circuit 102 may output a signal for synchronizing cycles and the clock signal CLK, and the cell balance devices B1 to Bn may receive the signal for synchronizing cycles and the clock signal CLK. Alternatively, the clock generation circuit 102 may output a signal for synchronizing cycles, and the cell balance devices B1 to Bn may generate signals for turning ON the switch circuits based on the signal for synchronizing cycles.

As described above, according to the battery system including the cell balance devices of the first embodiment, the cell balance devices can be enhanced in balance performance and therefore achieve a cell balance quickly. In addition, the number of secondary batteries to be connected to one cell balance device is not changed even if the number of secondary batteries is increased, and no high voltage process is therefore required so that manufacturing cost can be cut down. Besides, the battery system is flexible to increase or decrease in number of secondary batteries.

Second Embodiment

Figure 4:
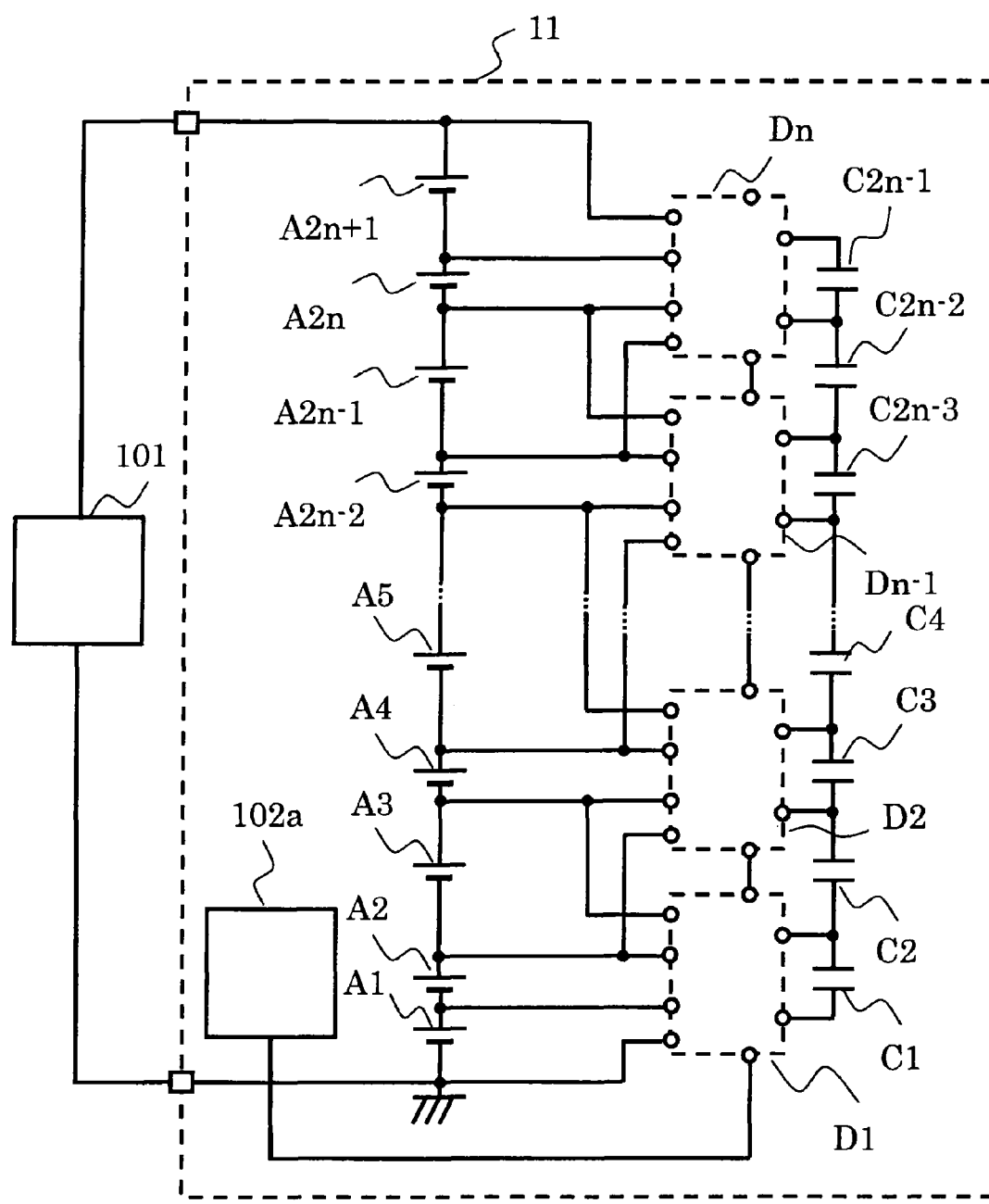
FIG. 4 is a circuit diagram of a battery system including cell balance devices according to a second embodiment of the present invention.
Figure 5:
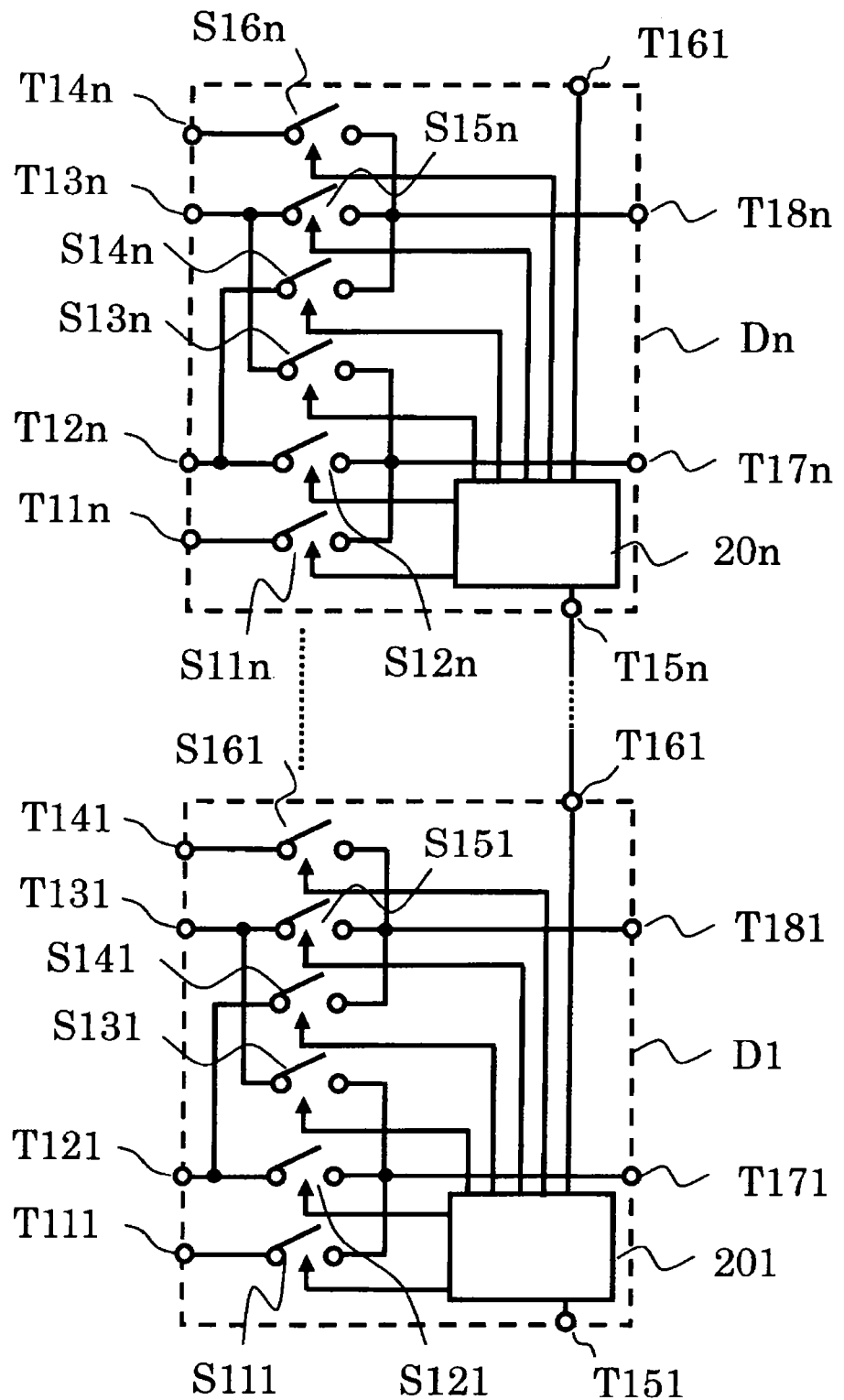
FIG. 5 is a circuit diagram of the cell balance devices according to the second embodiment.

FIG. 4 is a circuit diagram of a battery system including cell balance devices according to a second embodiment of the present invention. FIG. 5 is a circuit diagram of the cell balance devices according to the second embodiment. The second embodiment is different from the first embodiment in that a larger number of switch circuits are used in the cell balance device and the wiring of the battery system is changed correspondingly.

A battery system 11 of the second embodiment includes a clock generation circuit 102a, 2n+1 secondary batteries A1 to A2n+1 connected in series, n cell balance devices D1 to Dn, and 2n−1 voltage hold devices (capacitors) C1 to C2n−1 (n is an integer of 2 or more).

The first cell balance device D1 includes switch circuits S111, S121, S131, S141, S151, and S161, a control circuit 201, and terminals T111, T121, T131, T141, T151, T161, T171, and T181. The other cell balance devices D2 to Dn have the same configuration.

In the cell balance device D1, the terminal T111 is connected to a negative terminal of the secondary battery A1, the terminal T121 is connected to a positive terminal of the secondary battery A1, the terminal T131 is connected to a positive terminal of the secondary battery A2 and a terminal T112 of the cell balance device D2, the terminal T141 is connected to a positive terminal of the secondary battery A3 and a terminal T122 of the cell balance device D2, the terminal T171 is connected to any one terminal of the voltage hold device C1, the terminal T181 is connected the other terminal of the voltage hold device C1 and to any one terminal of the voltage hold device C2, the terminal T151 is connected to an output of the clock generation circuit 102a, and the terminal T161 is connected to a terminal T152 of the cell balance device D2.

In the cell balance device D2, the terminal T112 is connected to a negative terminal of the secondary battery A3, the terminal T122 is connected to the positive terminal of the secondary battery A3, a terminal T132 is connected to a positive terminal of the secondary battery A4 and a terminal T113 of the cell balance device D3, a terminal T142 is connected to a positive terminal of the secondary battery A5 and a terminal T123 of the cell balance device D3, a terminal T172 is connected to the other terminal of the voltage hold device C2 and one terminal of the voltage hold device C3, a terminal T182 is connected to the other terminal of the voltage hold device C3 and one terminal of the voltage hold device C4, the terminal T152 is connected to the terminal T161 of the cell balance device D1, and a terminal T162 is connected to a terminal T153 of the cell balance device D3.

In the cell balance device Dn, a terminal T11n is connected to a negative terminal of the secondary battery A2n−1 and a terminal T13n−1 of the cell balance device Dn−1, a terminal T12n is connected to a positive terminal of the secondary battery A2n−1 and a terminal T14n−1 of the cell balance device Dn−1, a terminal T13n is connected to a positive terminal of the secondary battery A2n, a terminal T14n is connected to a positive terminal of the secondary battery A2n+1, a terminal T17n is connected to one terminal of the voltage hold device C2n−2 and one terminal of the voltage hold device C2n−1, a terminal T18n is connected to the other terminal of the voltage hold device C2n−1, and a terminal T15n is connected to a terminal T16n of the cell balance device Dn−1.

In the cell balance device D1, the switch circuit S111 is connected to the terminal T111 and the terminal T171, the switch circuit S121 is connected to the terminal T121 and the terminal T171, the switch circuit S131 is connected to the terminal T131 and the terminal T171, the switch circuit S141 is connected to the terminal T121 and the terminal T181, the switch circuit S151 is connected to the terminal T131 and the terminal T181, and the switch circuit S161 is connected to the terminal T141 and the terminal T181. The switch circuits S111 to S161 are ON/OFF controlled by signals from the control circuit 201. The other cell balance devices D2 to Dn have the same connection.

Figure 6:
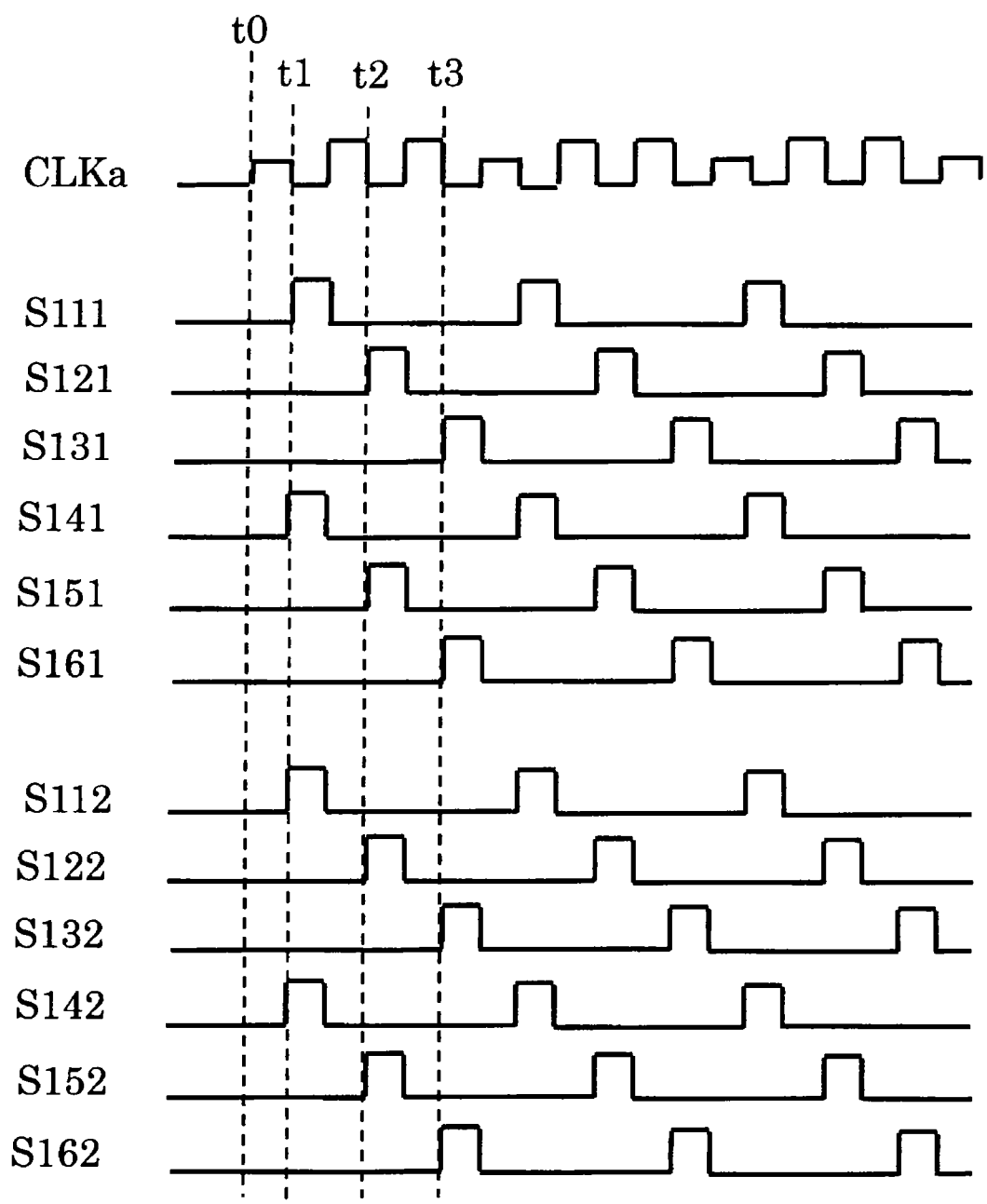
FIG. 6 is a timing chart of signals of the cell balance devices according to the second embodiment.
Figure 7:
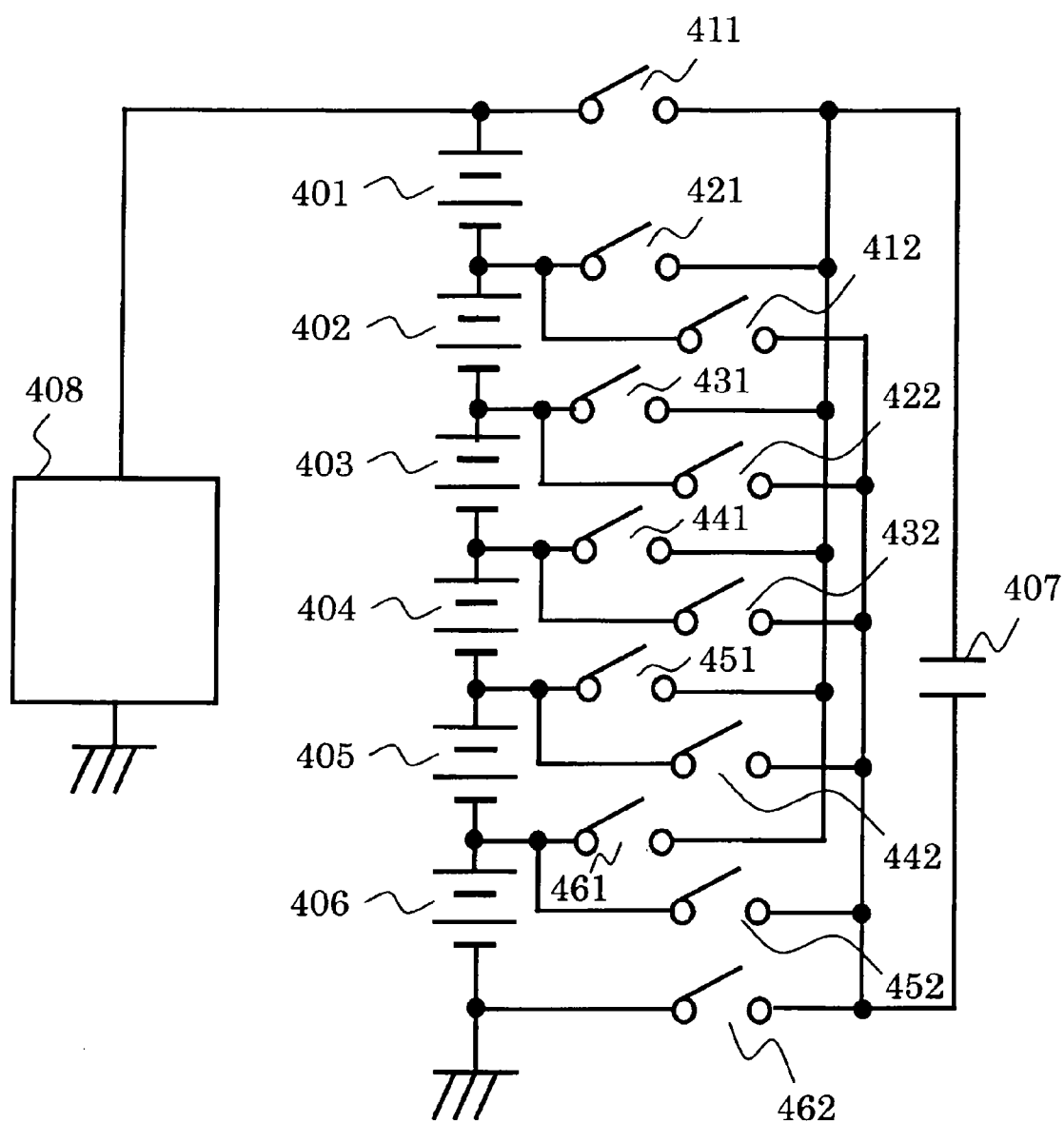
FIG. 7 is a circuit diagram of a cell balance device including a conventional cell balance adjusting circuit.

Next, an operation of the battery system 11 of the second embodiment is described. FIG. 6 is a timing chart of signals in the cell balance devices of the second embodiment.

At a time t0, the charger 101 is connected to the external terminals of the battery system 11, and then the clock generation circuit 102a outputs a clock signal CLKa. In the cell balance device D1, when the terminal T151 receives the clock signal CLKa, the control circuit 201 generates signals for turning ON the switch circuits S111 to S161 in synchronization with the clock signal CLKa, and outputs the signals sequentially. The control circuit 201 further outputs the clock signal CLKa to the terminal T161. In the next cell balance device D2, the terminal T152 receives the clock signal CLKa from the cell balance device D1. The clock signal CLKa is transmitted to the cell balance device Dn in this way, and all the cell balance devices D1 to Dn can be synchronized with one another. The switch circuits S111 to S11n and S141 to S14n, the switch circuits S121 to S12n and S151 to S15n, and the switch circuits S131 to S13n and S161 to S16n are therefore respectively controlled to be turned ON sequentially in synchronization with one another.

At a time t1, the switch circuits S111 to S11n and S141 to S14n are all turned ON and the switch circuits S121 to S12n and S151 to S15n and the switch circuits S131 to S13n and S161 to S16n are all turned OFF, and then the secondary batteries A1 to An−1 are connected in parallel to the voltage hold devices C1 to Cn−1, respectively. Then, the secondary batteries A1 to An−1 and the voltage hold devices C1 to Cn−1 perform charging or discharging, respectively.

At a time t2, the switch circuits S121 to S12n and S151 to S15n are all turned ON and the switch circuits S111 to S11n and S141 to S14n and the switch circuits S131 to S13n and S161 to S16n are all turned OFF, and then the secondary batteries A2 to An are connected in parallel to the voltage hold devices C1 to Cn−1, respectively. Then, the secondary batteries A2 to An and the voltage hold devices C1 to Cn−1 perform charging or discharging, respectively.

At a time t3, the switch circuits S131 to S13n and S161 to S16n are all turned ON and the switch circuits S111 to S1n and S141 to S14n and the switch circuits S121 to S12n and S151 to S15n are all turned OFF, and then the secondary batteries A3 to An+1 are connected in parallel to the voltage hold devices C1 to Cn−1, respectively. Then, the secondary batteries A3 to An+1 and the voltage hold devices C1 to Cn−1 perform charging or discharging, respectively.

Then, all the cell balance devices D1 to Dn repeat the same operation, with three clocks as one cycle.

Then, if the charger 101 is disconnected from the external terminals of the battery system 11, the clock generation circuit 102a stops outputting the clock signal CLKa, thereby finishing the cell balance operation.

By repeating charging/discharging between the secondary batteries A1 to An+1 and the voltage hold devices C1 to Cn−1 in this way, the voltages of the secondary batteries A1 to An+1 can be averaged to reduce voltage fluctuations. With this configuration including the plurality of voltage hold devices corresponding to the number of secondary batteries to be balanced, the cell balance device can be enhanced in balance performance (can be increased in speed for balance).

The clock signal CLKa output by the clock generation circuit 102a changes a crest value of the first clock at the beginning of every cycle. For example, the crest value of High is set to ½ of those of other clocks. Such clock signal CLKa can synchronize the cycles of the cell balance devices D1 to Dn, thus reducing the possibility of a malfunction.

Although not illustrated, even if the number of switch circuits within the cell balance device is increased more, the same operation can be performed to achieve a cell balance.

The battery system including the cell balance devices according to the second embodiment is not limited to the configuration described here, similarly to the first embodiment.

As described above, according to the battery system including the cell balance devices of the second embodiment, the cell balance devices can be enhanced in balance performance and therefore achieve a cell balance quickly. In addition, the number of secondary batteries to be connected to one cell balance device is not changed even if the number of secondary batteries is increased, and no high voltage process is therefore required so that manufacturing cost can be cut down. Besides, the battery system is flexible to increase or decrease in number of secondary batteries.

Third Embodiment

Figure 8:
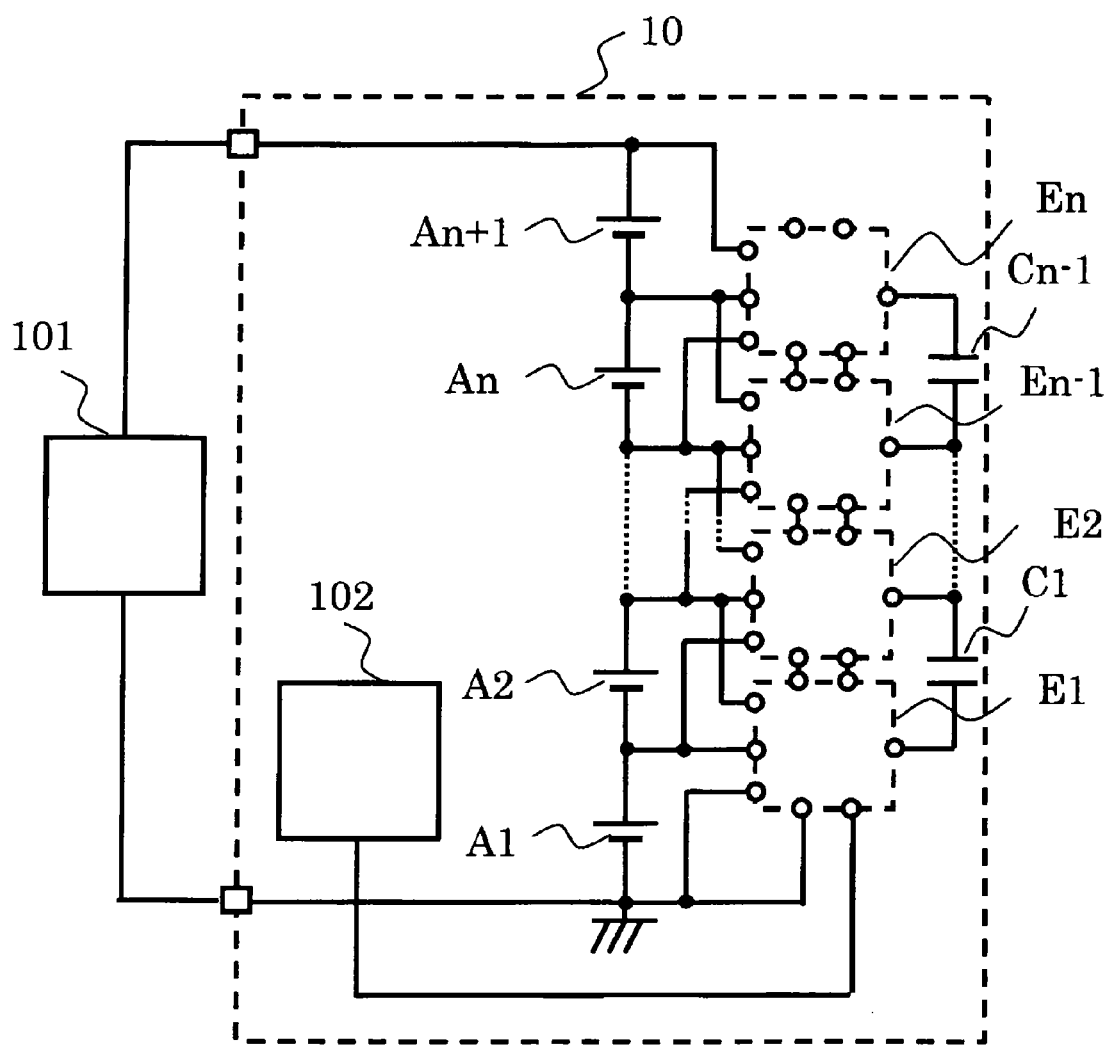
FIG. 8 is a circuit diagram of a battery system including cell balance devices according to a third embodiment of the present invention.
Figure 9:
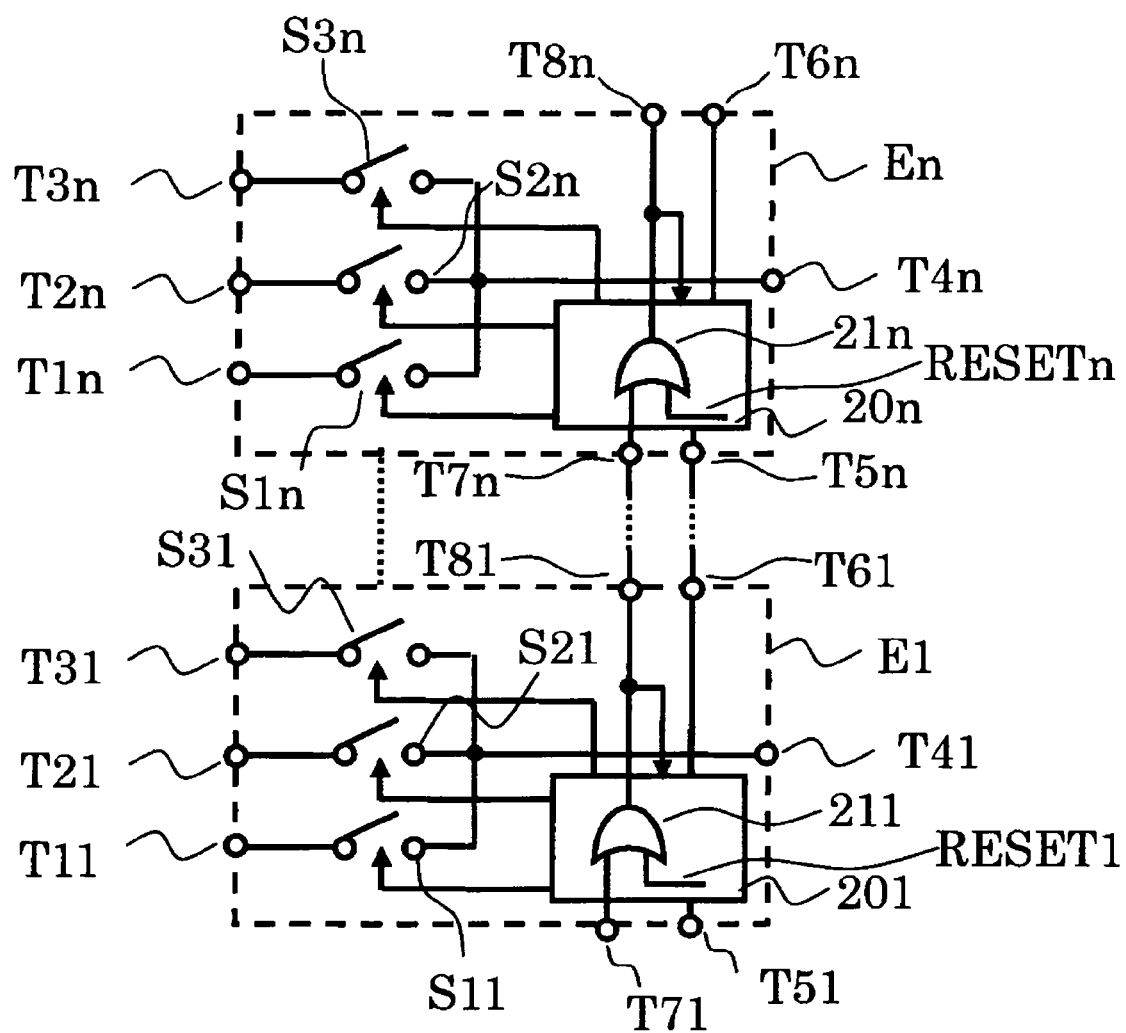
FIG. 9 is a circuit diagram of the cell balance devices according to the third embodiment.

FIG. 8 is a circuit diagram of a battery system including cell balance devices according to a third embodiment of the present invention. FIG. 9 is a circuit diagram of the cell balance devices according to the third embodiment.

A battery system 10 of the third embodiment includes a clock generation circuit 102, n+1 secondary batteries A1 to An+1 connected in series, n cell balance devices E1 to En, n−1 voltage hold devices (capacitors) C1 to Cn−1, and external terminals to which a charger 101 or a load is to be connected (n is an integer of 2 or more).

The first cell balance device E1 includes switch circuits S11, S21, and S31, a control circuit 201, and terminals T11, T21, T31, T41, T51, T61, T71, and T81. The terminal T71 is a reset signal receiving terminal and the terminal T81 is a reset signal transmitting terminal. The other cell balance devices E2 to En have the same configuration.

In the cell balance device E1, the terminal T11 and the terminal T71 are connected to a negative terminal of the secondary battery A1, the terminal T21 is connected to a positive terminal of the secondary battery A1 and a terminal T12 of the cell balance device E2, the terminal T31 is connected to a positive terminal of the secondary battery A2 and a terminal T22 of the cell balance device E2, the terminal T41 is connected to any one terminal of the voltage hold device C1, the terminal T51 is connected to an output of the clock generation circuit 102, the terminal T61 is connected to a terminal T52 of the cell balance device E2, and the terminal T81 is connected to a terminal T72 of the cell balance device E2. In the cell balance device B2, the terminal T22 is connected to a terminal T13 of the cell balance device B3, a terminal T32 is connected to a positive terminal of the secondary battery A3 and a terminal T23 of the cell balance device E3, a terminal T42 is connected to any one terminal of the voltage hold device C2 and the other terminal of the voltage hold device C1, a terminal T62 is connected to a terminal T53 of the cell balance device E3, and a terminal T82 is connected to a terminal T73 of the cell balance device E3. The same connection as in the cell balance device E2 is made up to the (n−1)th cell balance device En−1. In the cell balance device En, a terminal T1n is connected to a negative terminal of the secondary battery An, a terminal T2n is connected to a positive terminal of the secondary battery An and a terminal T3n−1 of the cell balance device En−1, a terminal T3n is connected to a positive terminal of the secondary battery An+1, and a terminal T4n is connected to the voltage hold device Cn−1.

In the cell balance device E1, the switch circuit S11 is connected to the terminal T11 and the terminal T41, the switch circuit S21 is connected to the terminal T21 and the terminal T41, and the switch circuit S31 is connected to the terminal T31 and the terminal T41. The switch circuits S11, S12, and S13 are ON/OFF controlled by signals from the control circuit 201. The other cell balance devices E2 to En have the same connection.

Figure 10:
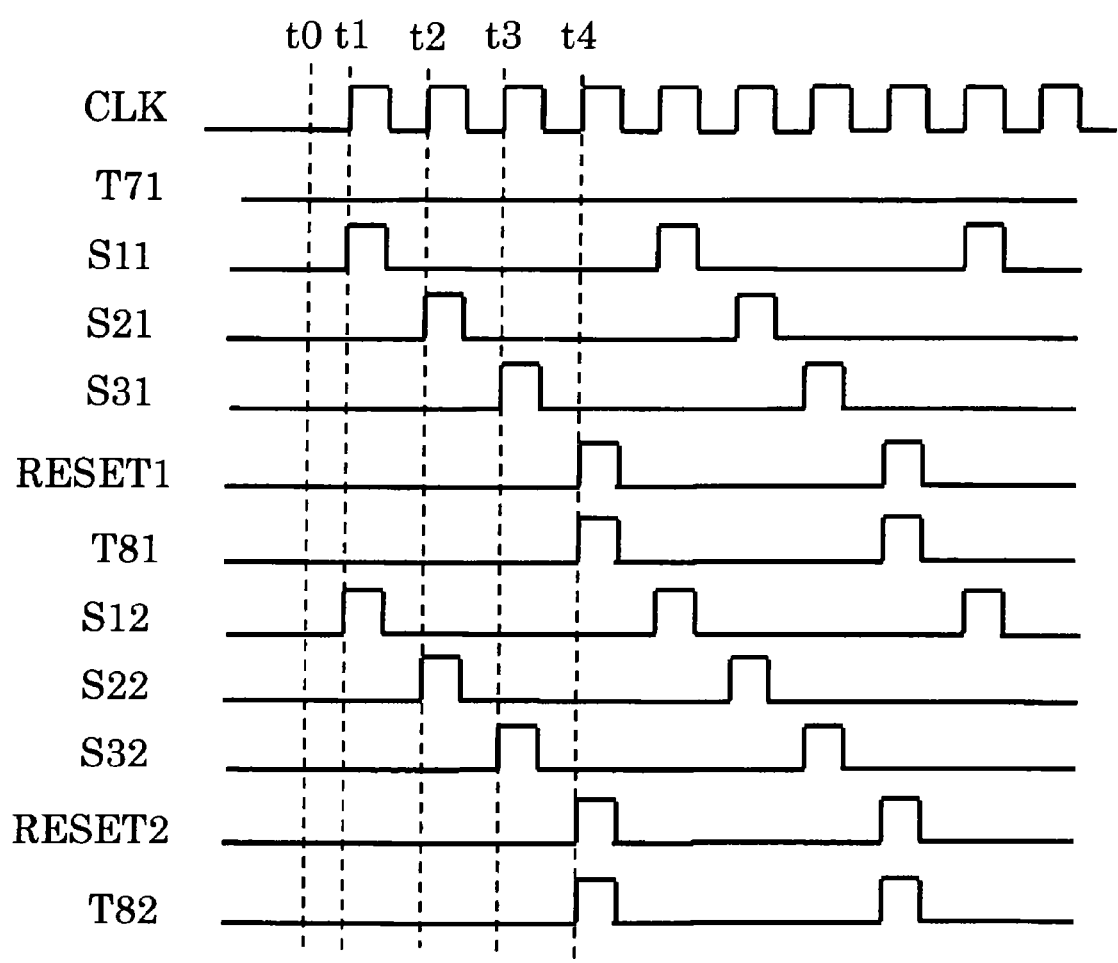
FIG. 10 is a timing chart of signals of the cell balance devices according to the third embodiment.

Next, an operation of the battery system 10 of the third embodiment is described. FIG. 10 is a timing chart of signals in the cell balance devices of the third embodiment.

The charger 101 is connected to the external terminals of the battery system 10, and then the clock generation circuit 102 outputs a clock signal CLK. In the cell balance device E1, when the clock signal CLK is input to the terminal T51, the control circuit 201 outputs the same clock signal CLK from the terminal T61. The control circuit 201 repeats the following one cycle operation in synchronization with the clock signal CLK.

One cycle
t0: initial state
t1: output of ON signal for S11 (Hi signal)
t2: output of ON signal for S21 (Hi signal)
t3: output of ON signal for S31 (Hi signal)
t4: output of RESET1 signal (Hi signal)→output of reset signal (to terminal T81)

An OR circuit 211 within the control circuit 201 performs OR operation between an internal node RESET1 signal, which is output in synchronization with the clock signal CLK, and a signal input to the terminal T71, and outputs a reset signal (Hi signal) from the terminal T81. This reset signal is also input to the control circuit 201, thereby returning the control circuit 201 to the initial state of t0. The cell balance devices E2 to En and the control circuits 202 to 20n perform the same operations, respectively.

Here, as illustrated in FIGS. 8 and 9, in the battery system 10, the terminal T61 and the terminal T52 are connected to each other and the terminal T81 and the terminal T72 are connected to each other. The same is applied to the other cell balance devices, and the terminals to the terminal T6n−1 and the terminals to the terminal T5n are respectively connected to each other in succession, and the terminals to the terminal T8n−1 and the terminals to the terminal T7n are respectively connected to each other in succession. The clock signal CLK and the reset signals are therefore communicated to each other, and the cell balance devices E1 to En can be synchronized to exchange electric charges between the secondary batteries A1 to An−1 and the voltage hold devices C1 to Cn−1 in the following manner.

At a time t1, the switch circuits S11 to S1n are all turned ON and the switch circuits S21 to S2n and the switch circuits S31 to S3n are all turned OFF, and then the secondary batteries A1 to An−1 are connected in parallel to the voltage hold devices C1 to Cn−1, respectively. Then, the secondary batteries A1 to An−1 and the voltage hold devices C1 to Cn−1 perform charging or discharging, respectively.

At a time t2, the switch circuits S21 to S2n are all turned ON and the switch circuits S11 to S1n and the switch circuits S31 to S3n are all turned OFF, and then the secondary batteries A2 to An are connected in parallel to the voltage hold devices C1 to Cn−1, respectively. Then, the secondary batteries A2 to An and the voltage hold devices C1 to Cn−1 perform charging or discharging, respectively.

At a time t3, the switch circuits S31 to S3n are all turned ON and the switch circuits S11 to S1n and the switch circuits S21 to S2n are all turned OFF, and then the secondary batteries A3 to An+1 are connected in parallel to the voltage hold devices C1 to Cn−1, respectively. Then, the secondary batteries A3 to An+1 and the voltage hold devices C1 to Cn−1 perform charging or discharging, respectively.

At a time t4, the reset signals are output from all the reset terminals T81 to T8n, and all the cell balance devices E1 to En are resynchronized with one another by the reset signals. All the cell balance devices E1 to En repeat the synchronization operation of the above-mentioned one cycle (four clocks).

By repeating charging/discharging between the secondary batteries A1 to An+1 and the voltage hold devices C1 to Cn−1 in this way, the voltages of the secondary batteries A1 to An+1 can be averaged to reduce voltage fluctuations (the cell balance can be achieved).

Then, if the charger 101 is disconnected from the external terminals of the battery system 10, the clock generation circuit 102 stops outputting the clock signal CLK, thereby finishing the cell balance operation.

On this occasion, if external noise is applied to the terminal T52, for example, the clock signal CLK may be disturbed to disable the synchronization between the cell balance device E1 and the cell balance devices E2 to En temporarily. Specifically, the cell balance devices E2 to En may enter the state of t2 to turn ON the switch circuits S22 to S2n, even though the cell balance device E1 is in the state of t1 and the switch circuit S11 is turned ON. Also in this case, the reset signal that is output from the terminal T81 at the time t4 in the above-mentioned one cycle is communicated through the OR circuits 212 to 21n, and the cell balance devices E1 to En are thus returned to the initial state simultaneously, thereby resynchronizing the cell balance devices E1 to En with one another.

The cell balance device and the battery system according to the present invention are configured to resynchronize the respective cell balance devices as described above, and are therefore resistant to external noise and high in cell balance performance. Further, with the configuration including the plurality of voltage hold devices corresponding to the number of secondary batteries to be balanced, the cell balance device can be enhanced in balance performance (can be increased in speed for balance). Besides, the cell balance devices and the voltage hold devices are cascaded to constitute a cell balance system, thus being flexible to increase or decrease in number of secondary batteries. With this configuration in which the number of secondary batteries to be connected to one cell balance device is not changed even if the number of secondary batteries is increased, the cell balance device requires no high voltage process and manufacturing cost can thus be cut down.

This embodiment has exemplified the battery system 10 that includes the secondary batteries as electric accumulators. The same configuration is also applicable when the electric accumulators are electric double-layer capacitors instead.

The cell balance operation described above is adapted to be performed when the charger 101 is connected to the battery system 10. Alternatively, the cell balance operation may be performed upon detection of overdischarge of a secondary battery. The cell balance operation may also be performed when the charger is disconnected after completion of charging. The condition for the cell balance operation is therefore not limited. The battery system 10 can increase operating time by achieving a cell balance under any conditions, such as when a charger is connected and when a secondary battery is overdischarged.

As described above, according to the battery system including the cell balance devices of the third embodiment, the cell balance devices can be enhanced in balance performance and therefore achieve a cell balance quickly. In addition, the number of secondary batteries to be connected to one cell balance device is not changed even if the number of secondary batteries is increased, and no high voltage process is therefore required so that manufacturing cost can be cut down. Besides, the battery system is flexible to increase or decrease in number of secondary batteries. In addition, with the reset signal output from the cell balance devices, all the cell balance devices can be synchronized with one another.

Fourth Embodiment

Figure 11:
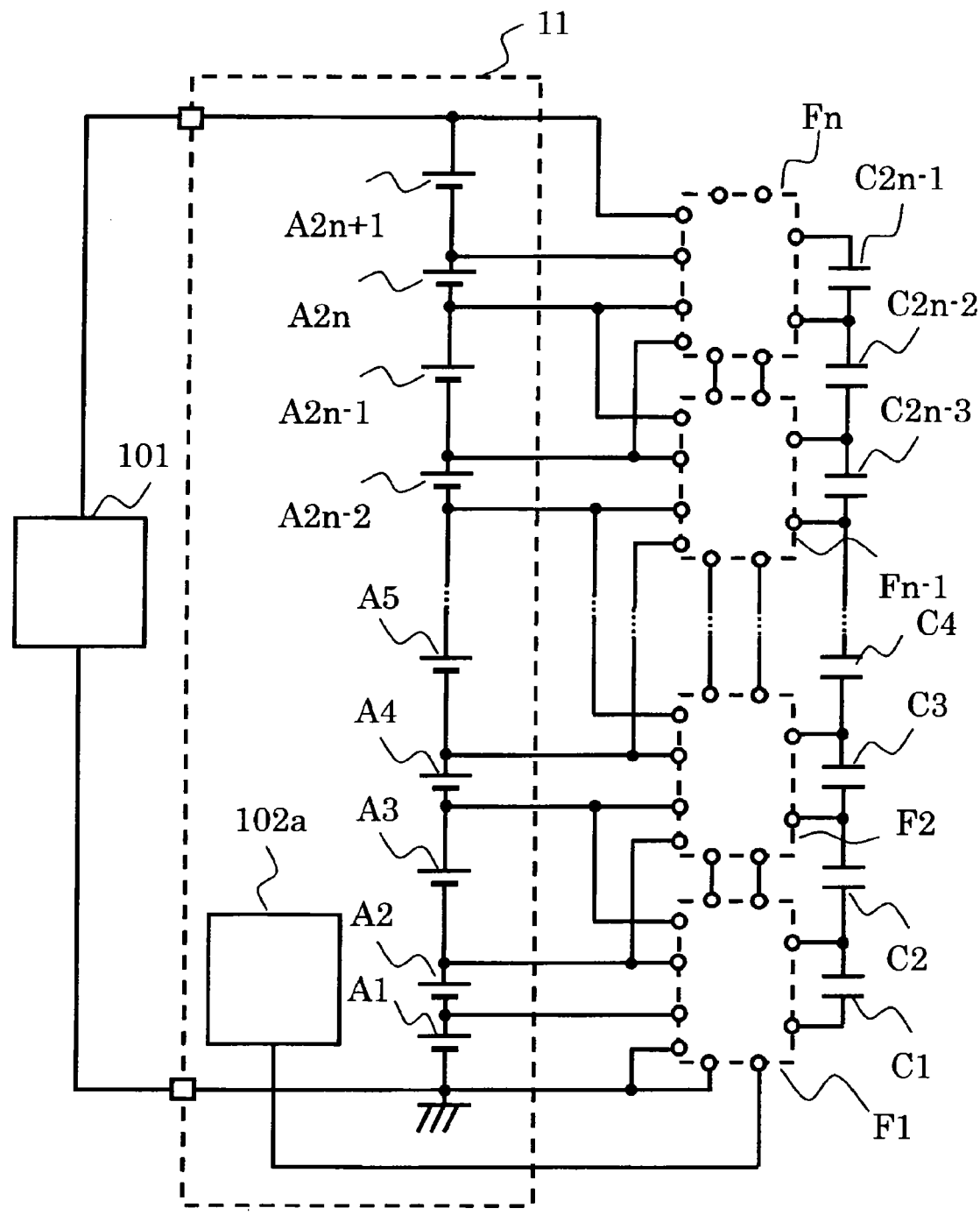
FIG. 11 is a circuit diagram of a battery system including cell balance devices according to a fourth embodiment of the present invention.
Figure 12:
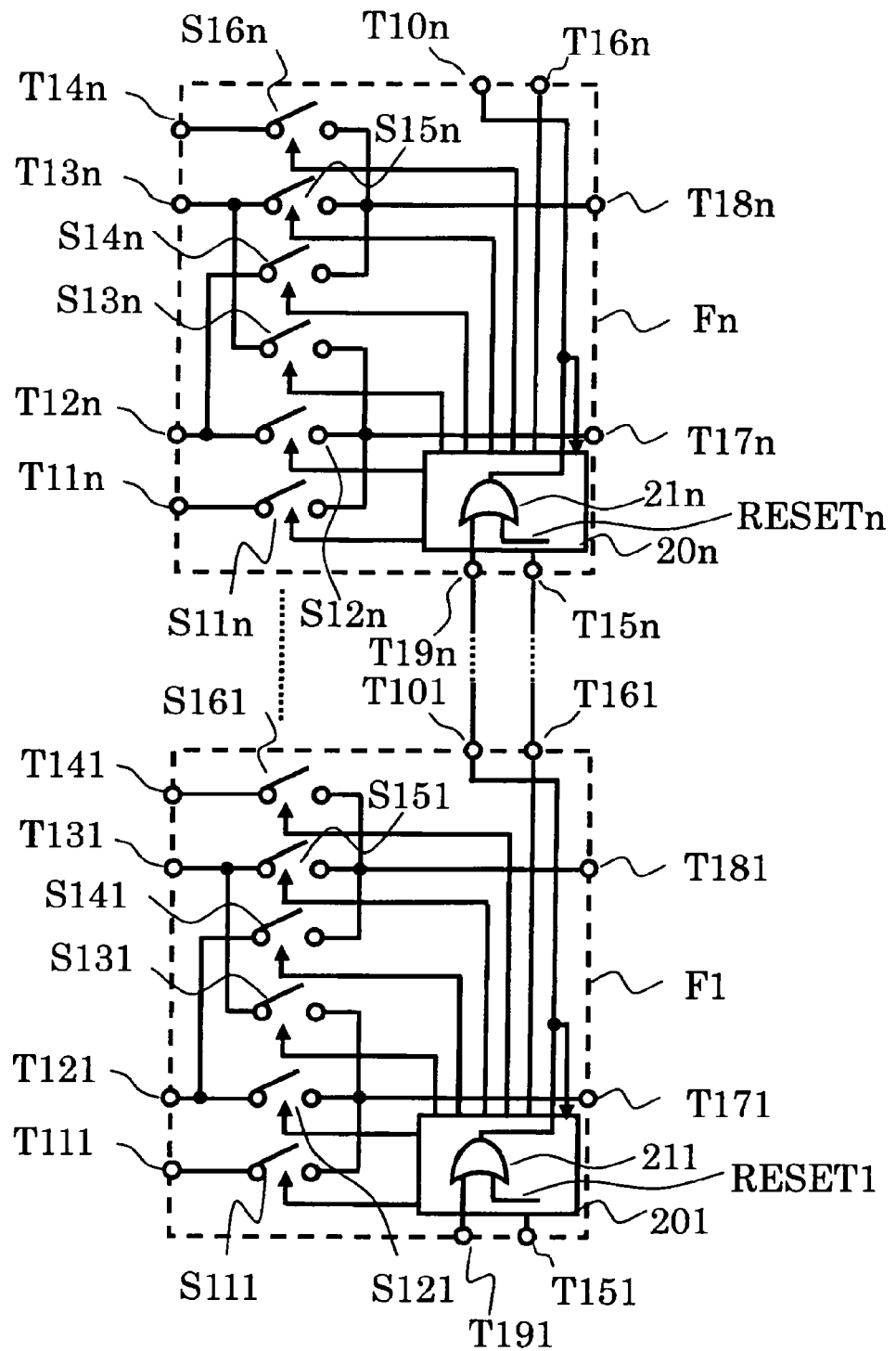
FIG. 12 is a circuit diagram of the cell balance devices according to the fourth embodiment.

FIG. 11 is a circuit diagram of a battery system including cell balance devices according to a fourth embodiment of the present invention. FIG. 12 is a circuit diagram of the cell balance devices according to the fourth embodiment.

A battery system 11 of the fourth embodiment includes a clock generation circuit 102a, 2n+1 secondary batteries A1 to A2n+1 connected in series, n cell balance devices F1 to Fn, and 2n−1 voltage hold devices (capacitors) C1 to C2n−1 (n is an integer of 2 or more).

The first cell balance device F1 includes switch circuits S111, S121, S131, S141, S151, and S161, a control circuit 201, and terminals T111, T121, T131, T141, T151, T161, T171, T181, T191, and T101. The terminal T191 is a reset signal receiving terminal and the terminal T101 is a reset signal transmitting terminal. The other cell balance devices F2 to Fn have the same configuration.

In the cell balance device F1, the terminal T111 and the terminal T191 are connected to a negative terminal of the secondary battery A1, the terminal T121 is connected to a positive terminal of the secondary battery A1, the terminal T131 is connected to a positive terminal of the secondary battery A2 and a terminal T112 of the cell balance device F2, the terminal T141 is connected to a positive terminal of the secondary battery A3 and a terminal T122 of the cell balance device F2, the terminal T171 is connected to one terminal of the voltage hold device C1, the terminal T181 is connected to the other terminal of the voltage hold device C1 and one terminal of the voltage hold device C2, the terminal T151 is connected to an output of the clock generation circuit 102a, the terminal T161 is connected to a terminal T152 of the cell balance device F2, and the terminal T101 is connected to a terminal T192 of the cell balance device F2.

In the cell balance device F2, the terminal T112 is connected to a negative terminal of the secondary battery A3, the terminal T122 is connected to the positive terminal of the secondary battery A3, a terminal T132 is connected to a positive terminal of the secondary battery A4 and a terminal T113 of the cell balance device F3, a terminal T142 is connected to a positive terminal of the secondary battery A5 and a terminal T123 of the cell balance device F3, a terminal T172 is connected to the other terminal of the voltage hold device C2 and one terminal of the voltage hold device C3, a terminal T182 is connected to the other terminal of the voltage hold device C3 and one terminal of the voltage hold device C4, the terminal T152 is connected to the terminal T161 of the cell balance device F1, the terminal T192 is connected to the terminal T101 of the cell balance device F1, a terminal T162 is connected to a terminal T153 of the cell balance device F3, and a terminal T102 is connected to a terminal T193 of the cell balance device F3.

In the cell balance device Fn, a terminal T11n is connected to a negative terminal of the secondary battery A2n−1 and a terminal T13n−1 of the cell balance device Fn−1, a terminal T12n is connected to a positive terminal of the secondary battery A2n−1 and a terminal T14n−1 of the cell balance device Fn−1, a terminal T13n is connected to a positive terminal of the secondary battery A2n, a terminal T14n is connected to a positive terminal of the secondary battery A2n+1, a terminal T17n is connected to one terminal of the voltage hold device C2n−2 and one terminal of the voltage hold device C2n−1, a terminal T18n is connected to the other terminal of the voltage hold device C2n−1, and a terminal T15n is connected to a terminal T16n of the cell balance device Fn−1.

In the cell balance device F1, the switch circuit S111 is connected to the terminal T111 and the terminal T171, the switch circuit S121 is connected to the terminal T121 and the terminal T171, the switch circuit S131 is connected to the terminal T131 and the terminal T171, the switch circuit S141 is connected to the terminal T121 and the terminal T181, the switch circuit S151 is connected to the terminal T131 and the terminal T181, and the switch circuit S161 is connected to the terminal T141 and the terminal T181. The switch circuits S111 to S161 are ON/OFF controlled by signals from the control circuit 201. The other cell balance devices F2 to Fn have the same connection.

Figure 13:
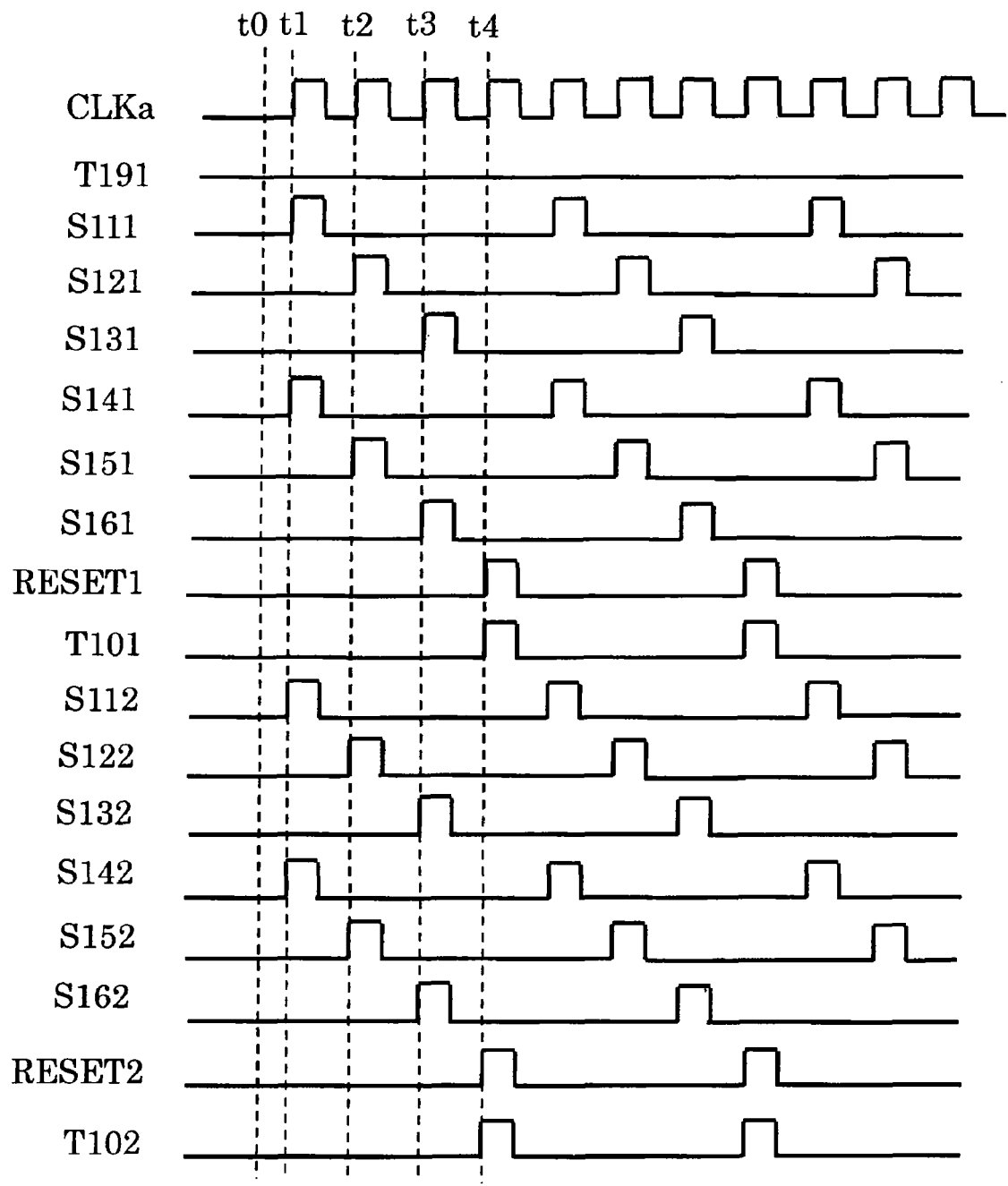
FIG. 13 is a timing chart of signals of the cell balance devices according to the fourth embodiment.

Next, an operation of the battery system 11 of the fourth embodiment is described. FIG. 13 is a timing chart of signals in the cell balance devices of the fourth embodiment.

The charger 101 is connected to the external terminals of the battery system 11, and then the clock generation circuit 102a outputs a clock signal CLKa. In the cell balance device F1, when the terminal T151 receives the clock signal CLKa as an input, the control circuit 201 outputs the same clock signal CLKa from the terminal T161. The control circuit 201 repeats the following one cycle operation in synchronization with the clock signal CLKa.

One cycle
 t0: initial state
 t1: output of ON signal for S111 and S141 (Hi signal)
 t2: output of ON signal for S121 and S151 (Hi signal)
 t3: output of ON signal for S131 and S161 (Hi signal)
 t4: output of RESET1 signal (Hi signal)→output of reset signal (to terminal T101)

An OR circuit 211 within the control circuit 201 performs OR operation between an internal node RESET1 signal, which is output in synchronization with the clock signal CLKa, and a signal input to the terminal T191, and outputs a reset signal (Hi signal) from the terminal T101. This reset signal is also input to the control circuit 201, thereby returning the control circuit 201 to the initial state of t0. The cell balance devices F2 to Fn and the control circuits 202 to 20n perform the same operations, respectively.

Here, as illustrated in FIGS. 11 and 12, in the battery system 11, the terminal T161 and the terminal T152 are connected to each other and the terminal T101 and the terminal T192 are connected to each other. The same is applied to the other cell balance devices, and the terminals to the terminal T16n−1 and the terminals to the terminal T15n are respectively connected to each other in succession, and the terminals to the terminal T10n−1 and the terminal to the terminal T19n are respectively connected to each other in succession. The clock signal CLKa and the reset signals are therefore communicated to each other, and the cell balance devices F2 to Fn can be synchronized to exchange electric charges between the secondary batteries A1 to An−1 and the voltage hold devices C1 to Cn−1 in the following manner.

At a time t1, the switch circuits S111 to S11n and S141 to S14n are all turned ON and the switch circuits S121 to S12n and S151 to S15n and the switch circuits S131 to S13n and S161 to S16n are all turned OFF, and then the secondary batteries A1 to An−1 are connected in parallel to the voltage hold devices C1 to Cn−1, respectively. Then, the secondary batteries A1 to An−1 and the voltage hold devices C1 to Cn−1 perform charging or discharging, respectively.

At a time t2, the switch circuits S121 to S12n and S151 to S15n are all turned ON and the switch circuits S111 to S11n and S141 to S14n and the switch circuits S131 to S13n and S161 to S16n are all turned OFF, and then the secondary batteries A2 to An are connected in parallel to the voltage hold devices C1 to Cn−1, respectively. Then, the secondary batteries A2 to An and the voltage hold devices C1 to Cn−1 perform charging or discharging, respectively.

At a time t3, the switch circuits S131 to S13n and S161 to S16n are all turned ON and the switch circuits S111 to S11n and S141 to S14n and the switch circuits S121 to S12n and S151 to S15n are all turned OFF, and then the secondary batteries A3 to An+1 are connected in parallel to the voltage hold devices C1 to Cn−1, respectively. Then, the secondary batteries A3 to An+1 and the voltage hold devices C1 to Cn−1 perform charging or discharging, respectively.

At a time t4, the reset signals are output from all the reset terminals T101 to T10n, and all the cell balance devices F1 to Fn are resynchronized with one another by the reset signals. All the cell balance devices F1 to Fn repeat the synchronization operation of the above-mentioned one cycle (four clocks).

By repeating charging/discharging between the secondary batteries A1 to An+1 and the voltage hold devices C1 to Cn−1 in this way, the voltages of the secondary batteries A1 to An+1 can be averaged to reduce voltage fluctuations (the cell balance can be achieved).

Then, if the charger 101 is disconnected from the external terminals of the battery system 11, the clock generation circuit 102a stops outputting the clock signal CLKa, thereby finishing the cell balance operation.

On this occasion, if external noise is applied to the terminal T152, for example, the clock signal CLKa may be disturbed to disable the synchronization between the cell balance device F1 and the cell balance devices F2 to Fn temporarily. Specifically, the cell balance devices F2 to Fn may enter the state of t2 to turn ON the switch circuits S122 to S12n, even though the cell balance device F1 is in the state of t1 and the switch circuit S111 is turned ON. Also in this case, the reset signal that is output from the terminal T101 at the time t4 in the above-mentioned one cycle is communicated through the OR circuits 212 to 21n, and the cell balance devices F1 to Fn are thus returned to the initial state simultaneously, thereby resynchronizing the cell balance devices F1 to Fn with one another.

The cell balance device and the battery system according to the present invention are configured to resynchronize the respective cell balance devices as described above, and are therefore resistant to external noise and high in cell balance performance. Further, with the configuration including the plurality of voltage hold devices corresponding to the number of secondary batteries to be balanced, the cell balance device can be enhanced in balance performance (can be increased in speed for balance).

Although not illustrated, even if the number of switch circuits within the cell balance device is increased more, the same operation can be performed to achieve a cell balance.

The battery system including the cell balance devices according to the fourth embodiment is not limited to the configuration described here, similarly to the third embodiment.

As described above, according to the battery system including the cell balance devices of the fourth embodiment, the cell balance devices can be enhanced in balance performance and therefore achieve a cell balance quickly. In addition, the number of secondary batteries to be connected to one cell balance device is not changed even if the number of secondary batteries is increased, and no high voltage process is therefore required so that manufacturing cost can be cut down. Besides, the battery system is flexible to increase or decrease in number of secondary batteries. In addition, with the reset signal output from the cell balance devices, all the cell balance devices can be synchronized with one another.

What is claimed is:

1. A cell balance circuit for a battery system for adjusting a cell balance of a plurality of electric accumulators connected in series, the cell balance circuit comprising a plurality of cell balance devices, each device comprising:
    a plurality of electric accumulator connection terminals comprising a first electric accumulator connection terminal, a second electric accumulator connection terminal, and a third electric accumulator connection terminal, each configured to connect to one of a node and two terminals of the plurality of electric accumulators;
    a voltage hold device connection terminal configured to connect to a designated one of a plurality of voltage hold devices, the number of voltage hold devices less than a total number of the electric accumulators;
    a plurality of switch circuits comprising a first switch circuit, a second switch circuit, and a third switch circuit, each connected to one of the plurality of electric accumulator connection terminals or the voltage hold device;
    a receiving terminal that receives a synchronization signal;
    a transmitting terminal that transmits the synchronization signal; and
    a control circuit that controls an ON/OFF state of the plurality of switch circuits based on the synchronization signal,
    wherein, when receiving the synchronization signal, the control circuit sequentially controls the ON/OFF state of the plurality of switch circuits, and
    wherein among the plurality of cell balance devices, a first stage receives the synchronization signal, and second and subsequent stages each include the transmitting terminal connected to the receiving terminal of the cell balance device at a next stage, such that the plurality of cell balance device are synchronized.

2. The cell balance circuit according to claim 1, wherein:
    the first switch circuit is connected between the first electric accumulator connection terminal and the voltage hold device connection terminal;
    the second switch circuit is connected between the second electric accumulator connection terminal and the voltage hold device connection terminal;
    the third switch circuit is connected between the third electric accumulator connection terminal and the voltage hold device connection terminal; and the first switch circuit, the second switch circuit, and the third switch circuit are sequentially ON/OFF based on the synchronization signal.

3. The cell balance circuit according to claim 2, wherein:
the plurality of electric accumulator connection terminals further comprise a fourth electric accumulator connection terminal;
the plurality of switch circuits further comprise a fourth switch circuit, a fifth switch circuit, and a sixth switch circuit;
the voltage hold device connection terminal further comprises a second voltage hold device connection terminal;
the fourth switch circuit is connected between the second electric accumulator connection terminal and the second voltage hold device connection terminal;
the fifth switch circuit is connected between the third electric accumulator connection terminal and the second voltage hold device connection terminal;
the sixth switch circuit is connected between the fourth electric accumulator connection terminal and the second voltage hold device connection terminal; and
the first switch circuit and the fourth switch circuit, the second switch circuit and the fifth switch circuit, and the third switch circuit and the sixth switch circuit are turned ON/OFF sequentially based on the synchronization signal.

4. The cell balance circuit according to claim 1, wherein the synchronization signal comprises a clock signal.

5. The cell balance circuit according to claim 1, further comprising:
a reset signal receiving terminal for receiving a first reset signal; and
a reset signal transmitting terminal for transmitting a second reset signal.

6. The cell balance circuit according to claim 5, wherein the control circuit is further configured to transmit the second reset signal from the reset signal transmitting terminal after a predetermined number of counts of the synchronization signal, when the receiving terminal receives the synchronization signal, or to transmit the second reset signal from the reset signal transmitting terminal, when the reset signal receiving terminal receives the first reset signal.

7. A battery system comprising:
a plurality of electric accumulators connected in series;
the plurality of the cell balance devices according to claim 1 connected in series;
a plurality of voltage hold devices connected in series; and
a clock generation circuit that outputs the synchronization signal,
wherein the plurality of the cell balance devices each comprise electric accumulator connection terminals connected to both terminals of a corresponding one of the plurality of electric accumulators, and the voltage hold device connection terminal connected to one of one terminal or both terminals of a corresponding one of the plurality of voltage hold devices.

8. A battery system according to claim 7, wherein: the cell balance device at a first stage comprises the receiving terminal connected to an output terminal of the clock generation circuit.

9. A battery system according to claim 7, wherein the plurality of the cell balance devices each comprise the receiving terminal connected to an output terminal of the clock generation circuit.

10. A battery system according to claim 7, wherein the clock generation circuit outputs the synchronization signal upon detection that a charger has been connected to external terminals of the battery system.

* * * * *